(12) United States Patent
Chen et al.

(10) Patent No.: US 11,149,706 B2
(45) Date of Patent: Oct. 19, 2021

(54) HYDRAULIC DRIVING SYSTEM AND DRIVING METHOD FOR BARRING

(71) Applicant: JIANGSU GOLDWIND SCIENCE & TECHNOLOGY CO., LTD., Jiangsu (CN)

(72) Inventors: Jinping Chen, Jiangsu (CN); Xingxing Shen, Jiangsu (CN); Jinzhong Zhang, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 279 days.

(21) Appl. No.: 16/470,862

(22) PCT Filed: May 2, 2018

(86) PCT No.: PCT/CN2018/085343
§ 371 (c)(1),
(2) Date: Jun. 18, 2019

(87) PCT Pub. No.: WO2019/178922
PCT Pub. Date: Sep. 26, 2019

(65) Prior Publication Data
US 2021/0033067 A1 Feb. 4, 2021

(30) Foreign Application Priority Data
Mar. 23, 2018 (CN) .......................... 201810247172.7

(51) Int. Cl.
*F15B 11/044* (2006.01)
*F03D 1/06* (2006.01)
(Continued)

(52) U.S. Cl.
CPC ......... *F03D 1/0658* (2013.01); *F03D 7/0296* (2013.01); *F03D 7/042* (2013.01);
(Continued)

(58) Field of Classification Search
CPC .... F15B 13/021; F15B 13/025; F03D 1/0658; F03D 13/10
See application file for complete search history.

(56) References Cited

U.S. PATENT DOCUMENTS 5,214,997 A * 6/1993 Lebret .................... F15B 13/01
91/420
6,805,161 B2 * 10/2004 Zenker .................. F15B 11/003
137/493.4
(Continued)

FOREIGN PATENT DOCUMENTS

CN 1718303 A 1/2006
CN 102380239 A 3/2012
(Continued)

OTHER PUBLICATIONS

The International Search Report dated Dec. 3, 2018; PCT/CN2018/085343.
(Continued)

*Primary Examiner* — Thomas E Lazo

(57) ABSTRACT

The disclosure relates to a hydraulic driving system and a driving method for barring. The driving system comprises: three or more main drive hydraulic cylinders, which are divided into two groups to provide pulling and pushing forces to a driven impeller, each main drive hydraulic cylinder including a cylinder body and a piston rod which divides the cylinder body into a rod cavity and a godless cavity, wherein an oil line for the rod cavity and an oil line for the godless cavity of each main drive hydraulic cylinder are controlled by one control valve module; and a control device, which controls the control valve module according to wind and/or load signals, to simultaneously convert flow directions of hydraulic oil in the oil line for the rod cavity
(Continued)

and the oil line for the godless cavity of at least one of the three or more main drive hydraulic cylinders.

13 Claims, 8 Drawing Sheets

(51) Int. Cl.
| | | |
|---|---|---|
| *F03D 9/25* | (2016.01) | |
| *F03D 7/02* | (2006.01) | |
| *F03D 7/04* | (2006.01) | |
| *F15B 13/02* | (2006.01) | |
| *F15B 13/01* | (2006.01) | |
| *F15B 11/00* | (2006.01) | |

(52) U.S. Cl.
CPC .............. *F03D 9/25* (2016.05); *F15B 11/044* (2013.01); *F15B 13/01* (2013.01); *F15B 13/025* (2013.01); *F15B 13/027* (2013.01); *F05B 2220/30* (2013.01); *F05B 2260/964* (2013.01); *F05B 2270/32* (2013.01); *F05B 2270/332* (2013.01); *F15B 11/003* (2013.01)

(56) References Cited

U.S. PATENT DOCUMENTS

| | | | |
|---|---|---|---|
| 7,958,797 B2* | 6/2011 | Aust | F03D 80/50 74/99 R |
| 8,710,693 B2* | 4/2014 | Amano | F03D 9/17 290/55 |
| 8,922,039 B2 | 12/2014 | Andersen et al. | |
| 10,197,075 B2* | 2/2019 | Brokes | F15B 15/262 |
| 10,273,941 B2* | 4/2019 | Pedersen | F03D 1/0691 |
| 2006/0136288 A1 | 9/2006 | Aust et al. | |
| 2012/0045328 A1* | 2/2012 | Rashidi | F16L 41/03 416/1 |
| 2014/0110949 A1 | 4/2014 | Brenner et al. | |
| 2014/0224048 A1* | 8/2014 | Munk-Hansen | F03D 15/00 74/142 |
| 2014/0377062 A1* | 12/2014 | Jakobsen | F03D 80/50 416/1 |
| 2016/0069322 A1* | 3/2016 | Leijnen | F03D 1/0675 416/147 |
| 2016/0298604 A1* | 10/2016 | Guern | F16F 13/08 |
| 2017/0051722 A1 | 2/2017 | Knoop | |
| 2021/0079889 A1* | 3/2021 | Li | F03D 7/042 |

FOREIGN PATENT DOCUMENTS

| | | |
|---|---|---|
| CN | 102536660 A | 7/2012 |
| CN | 103609017 A | 2/2014 |
| CN | 104541066 A | 4/2015 |
| CN | 105402175 A | 3/2016 |
| CN | 105473848 A | 4/2016 |
| CN | 107725496 A | 2/2018 |
| CN | 107781122 A | 3/2018 |
| CN | 107787122 A | 3/2018 |
| DE | 19817256 C1 | 7/1999 |
| DE | 102011017801 A1 | 10/2012 |
| DE | 102013008047 A1 | 11/2014 |
| EP | 2990664 A1 | 2/2016 |
| GB | 2303423 A | 2/1997 |
| KR | 20160129391 A | 11/2016 |
| WO | 2018/040710 A1 | 3/2018 |

OTHER PUBLICATIONS

Extended European Search Report dated Feb. 3, 2020; Appln. No. 18887212.1.
First Chinese Office Action dated Mar. 2, 2020; Appln. No. 201810247172.7.
Australian Exam Report No. 1 dated Apr. 17, 2020; Appln. No. 2018386354.
Second Australian Office Action Application No. 2018386354; dated Jul. 3, 2020.

* cited by examiner

HYDRAULIC DRIVING SYSTEM AND DRIVING METHOD FOR BARRING

CROSS-REFERENCE OF RELATED APPLICATION

This application is a National Stage of International Application No. PCT/CN2018/085343, filed on May 2, 2018, which claims priority to Chinese Patent Application No. 201810247172.7, filed on Mar. 23, 2018, both of which are incorporated herein by reference in their entireties.

TECHNICAL FIELD

The disclosure relates to the field of installation of a wind generator set, and in particular, to a hydraulic driving system and a driving method for barring.

BACKGROUND

A wind generator is a device that converts wind energy into electrical energy, and mainly includes structures such as a nacelle, a generator, and an impeller. The impeller is constituted by a hub and blades. An installation manner of the wind generator is first to install the hub to the nacelle and then to install the blades one by one to the hub. Specifically, it is necessary to rotate the hub along the axis to the corresponding position to install one blade, and then rotate the hub to the next mounting position to install the next blade.

There are many kinds of generators for the wind generator, such as doubly-fed generator, direct-driven generator, and the like. The doubly-fed generator may rotate the hub with its gearbox. The direct-driven generator has a hub which is directly connected to the generator rotor and has no gearbox inside, and thus, it cannot achieve controllable rotation of the rotor during the installation.

The diameter of the large megawatt direct-driven wind generator is much larger than the diameter of the doubly-fed generator, and is usually in the range from 3 m to 6m. When single blade only is mounted on the hub, the resistance torque applied onto the generator rotor by the gravity of the single blade and the wind load of the blade may be large, so the rotation torque required to drive the generator rotor may be also large. If a motor is used to drive the generator, the required motor power and the required reducer volume are relatively large, but there is no enough space in the direct-driven generator. In addition, the diameter of the generator of the large megawatt direct-driven set is as high as 3 m or more, even up to 6 m, and if gear transmission is used to drive such set, it is required to apply a driving torque onto the generator rotor, which makes it easy to cause the generator (especially the outer-rotor generator) to generate large deformation, thereby affecting the electromagnetic air gap of the generator and causing damage to the generator. At the same time, the gear transmission has higher requirements on the generator-side gear, so it is required to adopt a special structure to ensure its rigidity, which is difficult to be achieved.

In addition, the controllable rotation of the rotor cannot be achieved during direct-driven wind generator maintenance.

SUMMARY

According to embodiments of the disclosure, there is provided a hydraulic driving system and a driving method for barring, which is capable of buffering an abrupt change in load when the impeller rotates.

According to a first aspect, there is provided a hydraulic driving system for barring for use in a wind generator set. The hydraulic driving system comprises: three or more main drive hydraulic cylinders, which are divided into two groups to provide pulling and pushing forces to a driven impeller, each main drive hydraulic cylinder including a cylinder body and a piston rod which is disposed within the cylinder body to divide the cylinder body into a rod cavity and a godless cavity, wherein an oil line for the rod cavity and an oil line for the godless cavity of each main drive hydraulic cylinder are controlled by one control valve module; and a control device, which controls the control valve module according to wind and/or load signals, to simultaneously convert flow directions of hydraulic oil in the oil line for the rod cavity and the oil line for the godless cavity of at least one of the three or more main drive hydraulic cylinders.

According to the first aspect, the control valve module of at least one of the main drive hydraulic cylinders comprises a reversing valve which is connected to the oil line for the rod cavity and the oil line for the godless cavity, and the control device simultaneously converts the flow directions of the hydraulic oil in the oil line for the rod cavity and the oil line for the godless cavity by controlling the reversing valve.

According to the first aspect, the control valve module of each main drive hydraulic cylinder comprises a pressure reducing valve which is disposed in the oil line for the godless cavity, and the pressure reducing valve reduces pressure of the hydraulic oil when the hydraulic oil enters into the oil line for the godless cavity.

According to the first aspect, the pressure reducing valve is a fixed difference pressure reducing valve or a fixed ratio pressure reducing valve.

According to the first aspect, the control valve module of each main drive hydraulic cylinder comprises load balancing valves which are respectively disposed in the oil line for the godless cavity and the oil line for the rod cavity, and wherein, the load balancing valve in the oil line for the rod cavity is disposed to be opened by high-pressure oil in the oil line for the godless cavity, and the load balancing valve in the oil line for the godless cavity is disposed to be opened by high-pressure oil in the oil line for the rod cavity.

According to the first aspect, load balancing valves are respectively disposed on a godless cavity side and a rod cavity side of each main drive hydraulic cylinder, and wherein, the load balancing valve on the rod cavity side is disposed to be opened by high-pressure oil in the oil line for the godless cavity, and the load balancing valve on the godless cavity side is disposed to be opened by high-pressure oil in the oil line for the rod cavity.

According to the first aspect, the hydraulic driving system further comprises a hydraulic station for supplying high-pressure oil, wherein load balancing valves are disposed after a high-pressure oil outlet of the hydraulic station.

According to the first aspect, the hydraulic station comprises two flow pumps, which are used to simultaneously supply the hydraulic oil to the system, alternatively, one of which is used to supply the hydraulic oil to the system.

According to the first aspect, the two flow pumps are load-sensitive variable displacement pumps.

According to the first aspect, at least one of the three or more main drive hydraulic cylinders is provided with a displacement sensor which is used to detect displacement of the piston rod.

According to the first aspect, the number of the three or more main drive hydraulic cylinders is five, and the five main drive hydraulic cylinders are sequentially distributed as a thrust hydraulic cylinders, a tension hydraulic cylinder, a thrust hydraulic cylinder, a thrust hydraulic cylinder, and a tension hydraulic cylinder.

According to the first aspect, the thrust hydraulic cylinders and the tension hydraulic cylinders have the same driving direction.

According to the first aspect, the main drive hydraulic cylinder drives a slide carriage through the piston rod such that a locking pin is aligned with a locking hole.

According to a second aspect, there is further provided a driving method for barring, which is used to drive an impeller of a wind generator set to rotate and maintain stationary at a predetermined position by the above mentioned hydraulic driving system for barring, wherein the driving method comprises: setting flow directions of hydraulic oil in the oil line for the rod cavity and the oil line for the godless cavity of the three or more main drive hydraulic cylinders according to a direction to be rotated by a generator rotor; and controlling the control valve module according to wind and/or load signals to simultaneously convert the flow directions of the hydraulic oil in the oil line for the rod cavity and the oil line for the godless cavity of at least one of the three or more main drive hydraulic cylinders.

According to the second aspect, the method further comprises acquiring a relative displacement amount of the main drive hydraulic cylinder, and controlling the main drive hydraulic cylinder to stop running when the relative displacement amount reaches a predetermined threshold.

According to the second aspect, the acquiring the relative displacement amount of the main drive hydraulic cylinder comprises: monitoring a current displacement amount of the piston rod of the main drive hydraulic cylinder; and comparing the current displacement amount with the displacement amount in an initial state of the main drive hydraulic cylinder to acquire the relative displacement amount of the main drive hydraulic cylinder.

According to a third aspect, there is further provided a driving method for barring, comprising the steps of: initializing alignment; determining rotation direction and rotation angle; driving main drive hydraulic cylinders to rotate a generator rotor by a small angle; maintaining position; retracting the main drive hydraulic cylinders and preparing for the next cycle; cycling driving the main drive hydraulic cylinders to rotate the generator rotor when the driving does not reach a preset angle, and performing stopping and maintaining the position when the driving reaches the preset angle.

As above, the hydraulic driving system and the driving method according to the embodiments of the disclosure can change the direction of the acting force of at least one of the hydraulic cylinders through the reversing valve, and therefore can controllable make an abrupt change in the power provided by the hydraulic driving system, thereby coping with the abrupt change of load in the actual working condition, reducing the vibration shock of the system, and making the driving process smoother and safer.

BRIEF DESCRIPTION OF THE DRAWINGS

The disclosure may be better understood from the following description of the embodiments of the disclosure.

Other features, objects, and advantages of the disclosure will be apparent from the following detailed description of the non-restrictive embodiments with reference to the accompanying drawings, in which the same or similar reference numerals denote the same or similar features.

Figure 1:
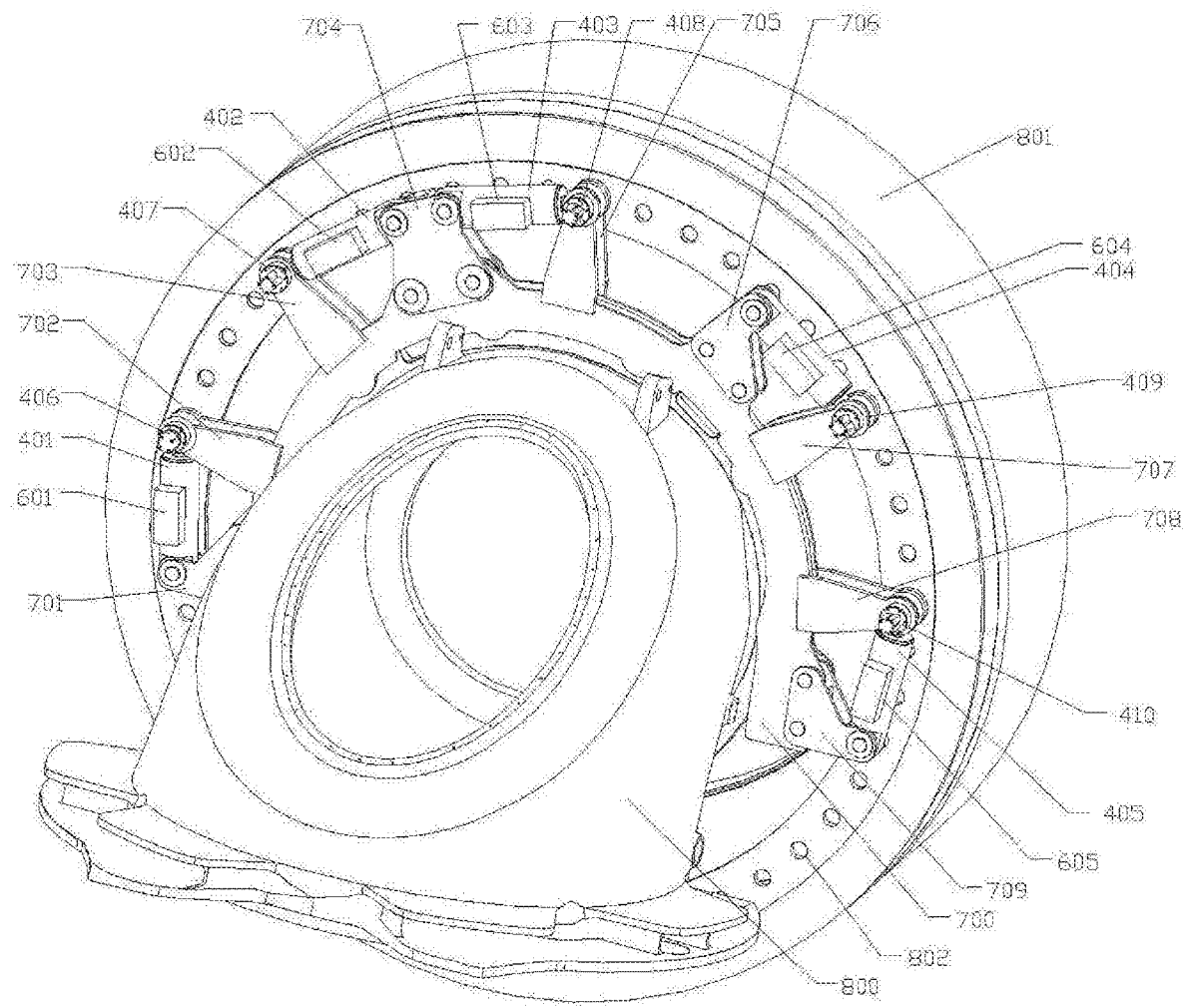
FIG. 1 is a schematic view showing the overall structure of the hydraulic driving system for barring according to an embodiment of the disclosure.

Wherein:

1—load-sensitive variable pump; 11—load-sensitive variable pump;

10—impeller; 20—flow compensating valve; 50—check valve for oil return pipe; 52—shuttle valve; 60—pump-side valve block;

100—first control unit; 200—second control unit; 300—third control unit; 400—fourth control unit; 500—fifth control unit;

401—thrust hydraulic cylinder; 402—tension hydraulic cylinder; 403—thrust hydraulic cylinder; 404—thrust hydraulic cylinder; 405—tension hydraulic cylinder; 406—locking hydraulic cylinder; 407—locking hydraulic cylinder; 408—locking hydraulic cylinder;

409—locking hydraulic cylinder; 410—locking hydraulic cylinder;

501—displacement sensor; 502—pressure sensor; 503—load balancing valve; 504—check valve; 505—pressure reducing valve; 507—reversing valve;

513—reversing valve;

521—pressure sensor; 523—load balancing valve; 524—reversing valve; 525—safety valve; 526—reversing valve; 527—safety valve; 529—reversing valve;

551—load balancing valve; 552—load balancing valve;

601—first cylinder-side valve block; 602—second cylinder-side valve block;

700—main structure 700 of the barring device;

701—first support; 702—first slide carriage; 703—second slide carriage; 704—second support; 705—third slide carriage; 706—third support; 707—fourth slide carriage; 708—fifth slide carriage; 709—fourth support 709;

800—base; 801—generator rotor; 803—locking hole;

901—tubing inlet port quick plug; and 904—tubing inlet port quick plug.

DETAILED DESCRIPTION

Features and exemplary embodiments according to various aspects of the disclosure are described in detail below. In the following detailed description, numerous specific details are set forth to provide comprehensive understanding of the disclosure. However, it will be apparent to the skilled in the art that the disclosure may be practiced without some of the specific details. The following description of the embodiments is merely to provide a better understanding of the disclosure. In the figures and the following description, at least some of the known structures and techniques are not shown, to avoid unnecessarily obscuring the disclosure. Further, for clarity, the dimension of some of the structures may be enlarged. The same reference numerals in the drawings denote the same or similar structures, and thus their detailed description will be omitted. Furthermore, the features, structures, or characteristics described hereinafter may be combined in any suitable manner in one or more embodiments.

The hydraulic driving system and the driving method for barring according to the disclosure can be applied for rotational driving of the impeller of the direct-driven wind generator, to realize reliable and controllable driving of the impeller. The details will be described below in conjunction with the embodiments shown in FIGS. 1 to 6.

Figure 2:
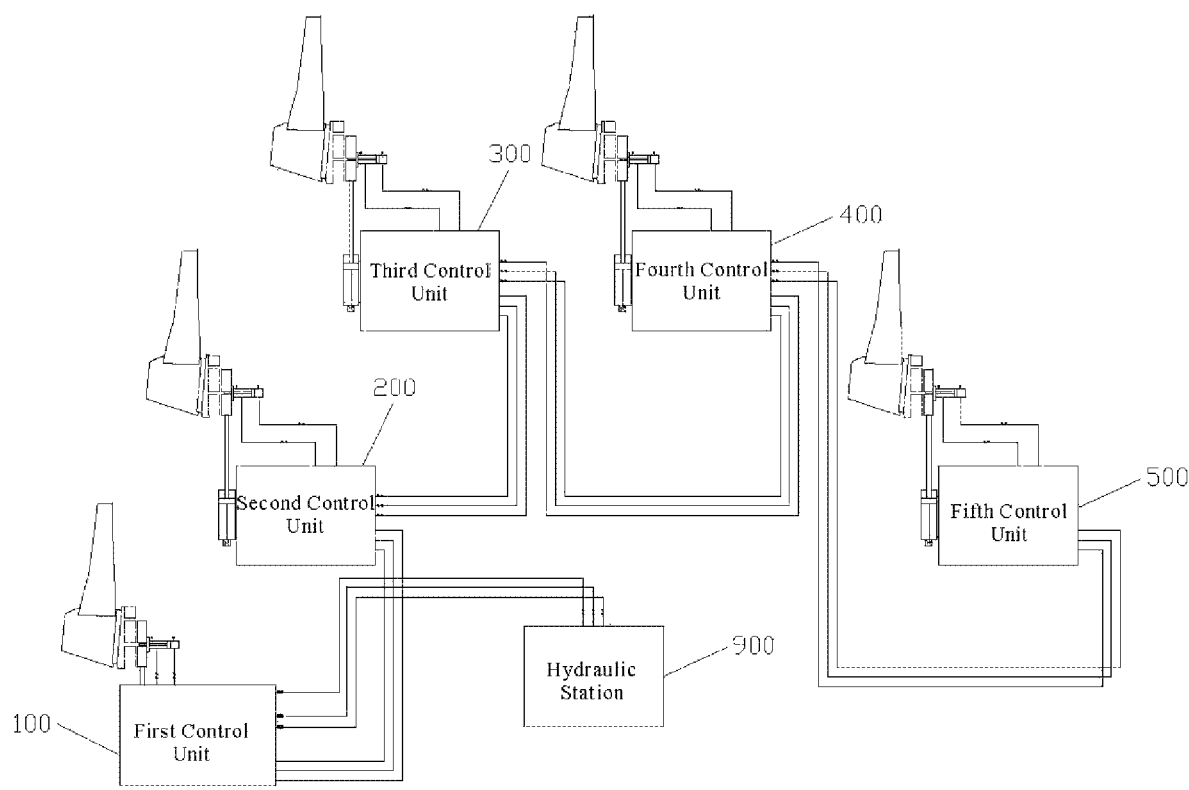
FIG. 2 is a schematic view showing a control principle of the hydraulic driving system for barring shown in FIG. 1.

FIG. 1 is a schematic view showing the overall structure of the hydraulic driving system for barring according to the disclosure, and FIG. 2 is a schematic view showing a control principle of the hydraulic driving system for barring shown in FIG. 1. Referring to FIG. 1 and FIG. 2, a generator rotor 801 is rotatably disposed on a base 800, and locking holes 802 are provided on the end surface of the generator rotor 801. The hydraulic driving system for barring (hereinafter referred to as the hydraulic driving system) can drive the generator rotor 801 to rotate by applying a force to the locking holes 802.

The hydraulic driving system includes two or more main drive hydraulic cylinders, which are divided into two groups to provide pulling and pushing forces to the driven impeller. The main drive hydraulic cylinder includes: a cylinder body and a piston rod which is disposed within the cylinder body to divide the cylinder body into a rod cavity and a godless cavity, wherein an oil line for the rod cavity and an oil line for the godless cavity of each main drive hydraulic cylinder are controlled by one control valve module; a control device which controls the control valve module according to the wind load signal, to simultaneously convert flow directions of hydraulic oil in the oil line for the rod cavity and the oil line for the godless cavity for at least one of the two or more main drive hydraulic cylinders. The hydraulic driving system according to the disclosure can change the direction of the acting force of at least one of hydraulic cylinder through reversing valve, and therefore can controllable make an abrupt change in the power provided by the hydraulic driving system, thereby coping with the abrupt change of load in the actual working condition, reducing the vibration shock of the system, and making the driving process smoother and safer.

Specifically, the main structure of the hydraulic driving system includes three thrust hydraulic cylinders, two tension hydraulic cylinders, and a reversing valve. The thrust hydraulic cylinder 401, the thrust hydraulic cylinder 403, and the thrust hydraulic cylinder 404 each include a retractable first piston rod, a rod cavity, and a godless cavity. The tension hydraulic cylinder 402 and the tension hydraulic cylinder 405 each include a retractable second piston rod, a rod cavity, and a godless cavity. The torque provided when the second piston rod of the tension hydraulic cylinder is retracted has the same direction as the torque provided when the first piston rod of the thrust hydraulic cylinder is elongated. The reversing valve is disposed in the oil line for the godless cavity and the oil line for the rod cavity of the thrust hydraulic cylinder, and the flow direction of hydraulic oil in the oil line for the godless cavity and the oil line for the rod cavity of the thrust hydraulic cylinder can be simultaneously converted through the operation of the reversing valve. Preferably, the number of the reversing valves is one, which is only provided in the oil line for the thrust hydraulic cylinder 401. Before the reversing valve is operated, the godless cavity of the thrust hydraulic cylinder 401 communicates with the oil inlet pipeline, and the rod cavity communicates with the oil return pipeline; when the reversing valve is operated, the godless cavity of the thrust hydraulic cylinder 401 communicates with the oil return pipeline, and the rod cavity communicates with the oil inlet pipeline, such that the first piston rod of the thrust hydraulic cylinder 401 is retracted (or tends to retract), thereby changing the direction of the force outputted by the hydraulic cylinder, and ultimately changing the direction of the torque provided by the hydraulic cylinder. The above function can make the torque provided by the hydraulic driving system produce a controlled abrupt change, thereby coping with the working condition where the load is abruptly changed and make the whole system operate safer and more stable.

Further, the hydraulic driving system further includes a main structure 700 of the barring device, four supports, five slide carriages, and five locking hydraulic cylinders.

The main structure 700 of the barring device is a mounting base, which can integrate other components of the hydraulic driving system into one body, and is thus convenient for lifting installation. The main structure 700 of the barring device has a ring-like structure, and a plurality of spaced tracks are provided on the outer edge of the ring. The main structure 700 of the barring device may be fixed to the base 800 and be disposed coaxially with the generator rotor 801.

The four supports are respectively a first support 701, a second support 704, a third support 706 and a fourth support 709. The four supports are sequentially distributed on the outer edge of the ring of the main structure 700 of the barring device, and the top ends of the supports each protrude along the radial direction of the ring.

The five slide carriages are respectively a first slide carriage 702, a second slide carriage 703, a third slide carriage 705, a fourth slide carriage 707, and a fifth slide carriage 708. The five slide carriages are slidably disposed on the track of the main structure 700 of the barring device, and the top ends of the five slide carriages each protrude along the radial direction of the main structure 700 of the barring device.

The first slide carriage 702 is located on the clockwise side of the first support 701. The thrust hydraulic cylinder 401 is disposed between the first support 701 and the first slide carriage 702. The cylinder body of the thrust hydraulic cylinder 401 is hinged to the top end of the first support 701, and the first piston rod of the thrust hydraulic cylinder 401 is hinged to the top end of the first slide carriage 702. Therefore, the first piston can drive the first slide carriage 702 to slide along the guide track of the main structure 700 of the barring device when it is elongated.

The second slide carriage 703 is disposed on the counterclockwise side of the second support 704. The cylinder body of the tension hydraulic cylinder 402 is hinged to the second support 704, and the second piston rod of the tension hydraulic cylinder 402 is hinged to the second slide carriage 703. The second piston rod can drive the second slide carriage 703 to slide along the guide track of the main structure 700 of the barring device when it is retracted.

The third slide carriage 705 is disposed on the clockwise side of the second support 704 with the thrust hydraulic cylinder 403 connected therebetween. The fourth slide carriage 707 is disposed on the clockwise side of the third support 706 with the thrust hydraulic cylinder 404 connected therebetween. The fifth slide carriage 708 is disposed on the counterclockwise side of the fourth support 709 with the tension hydraulic cylinder 405 connected therebetween. For the specific connection manners of the thrust hydraulic cylinder 403, the thrust hydraulic cylinder 404, and the tension hydraulic cylinder 405, reference may be made to the connection description of the thrust hydraulic cylinder 401 or the tension hydraulic cylinder 402.

The five locking hydraulic cylinders are respectively a locking hydraulic cylinder 406, a locking hydraulic cylinder 407, a locking hydraulic cylinder 408, a locking hydraulic cylinder 409, and a locking hydraulic cylinder 410. The five locking hydraulic cylinders are sequentially connected to the top ends of the first slide carriage 702, the second slide carriage 703, the third slide carriage 705, the fourth slide carriage 707, and the fifth slide carriage 708. The elongating and retracting directions of the five locking hydraulic cylinders are along the axial direction of the generator rotor 801, and the piston rods of the locking hydraulic cylinders can drive the locking pins into and out of the locking holes 802 disposed on the end face of the generator rotor 801. When the locking pins enter the locking holes 802 disposed on the end face of the generator rotor 801, the thrust hydraulic cylinder and the tension hydraulic cylinder can drive the five slide carriages to slide along the guide track of the main structure 700 of the barring device, and meantime, can drive the generator rotor 801 to rotate with the locking pins. In the present embodiment, the hydraulic cylinder that drives the generator rotor 801 to rotate is a servo hydraulic cylinder.

The first cylinder-side valve block 601, the second cylinder-side valve block 602, and the third cylinder-side valve block 603, the fourth cylinder-side valve block 604, and the fifth cylinder-side valve block 605 are successively disposed on the thrust hydraulic cylinder 401, the tension hydraulic cylinder 402, the thrust hydraulic cylinder 403, the thrust hydraulic cylinder 404, and the tension hydraulic cylinder 405. The above five valve blocks are used to install and connect valves such as the reversing valve, a pressure relief valve and a balancing valve, and respectively constitute a control unit of each hydraulic cylinder (i.e., the first control unit 100, the second control unit 200, the third control unit 300, the fourth control unit 400, and the fifth control unit 500 as shown in FIG. 2). A hydraulic station 900 is used to supply hydraulic oil to the respective control units.

The reversing valve is disposed in the first control unit 100 for controlling the elongation and retraction of the thrust hydraulic cylinder 401 and the elongation and retraction of the locking hydraulic cylinder 406.

The control principle of the hydraulic driving system will be described below with reference to FIGS. 3 to 6.

Figure 3:
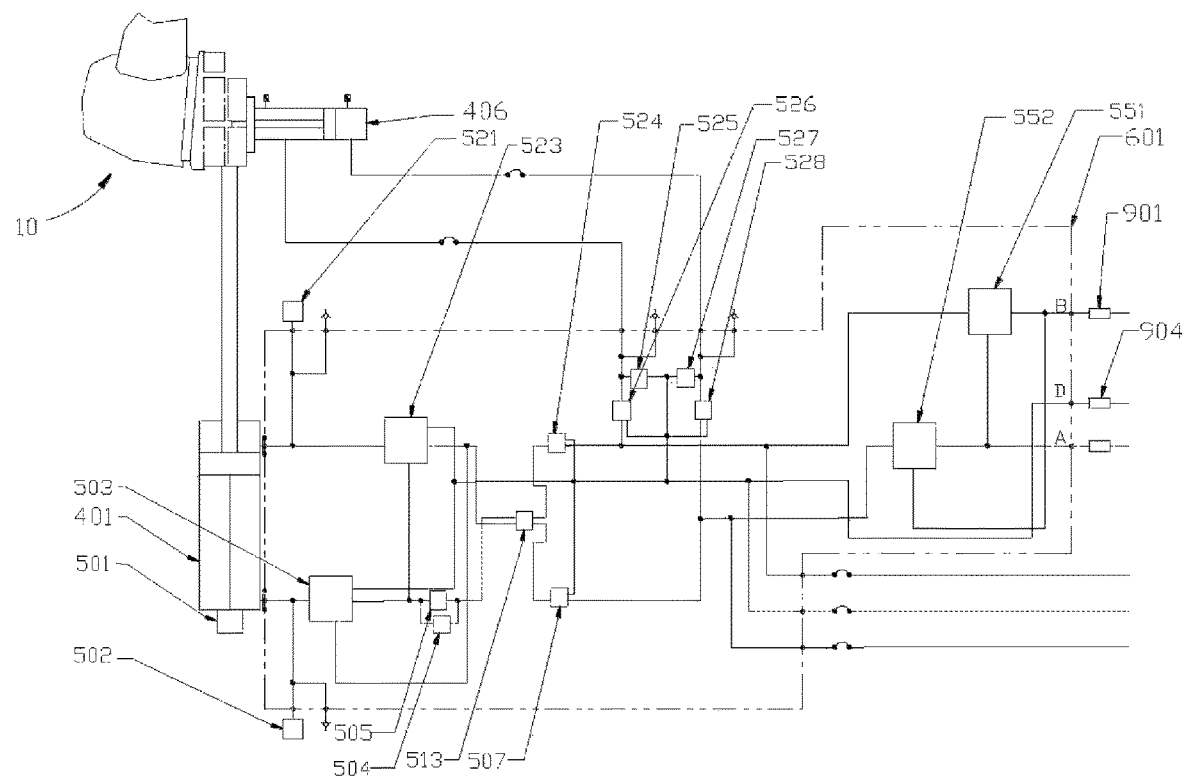
FIG. 3 is a principle view of the thrust hydraulic cylinder and its control unit shown in FIG. 2.
Figure 4:
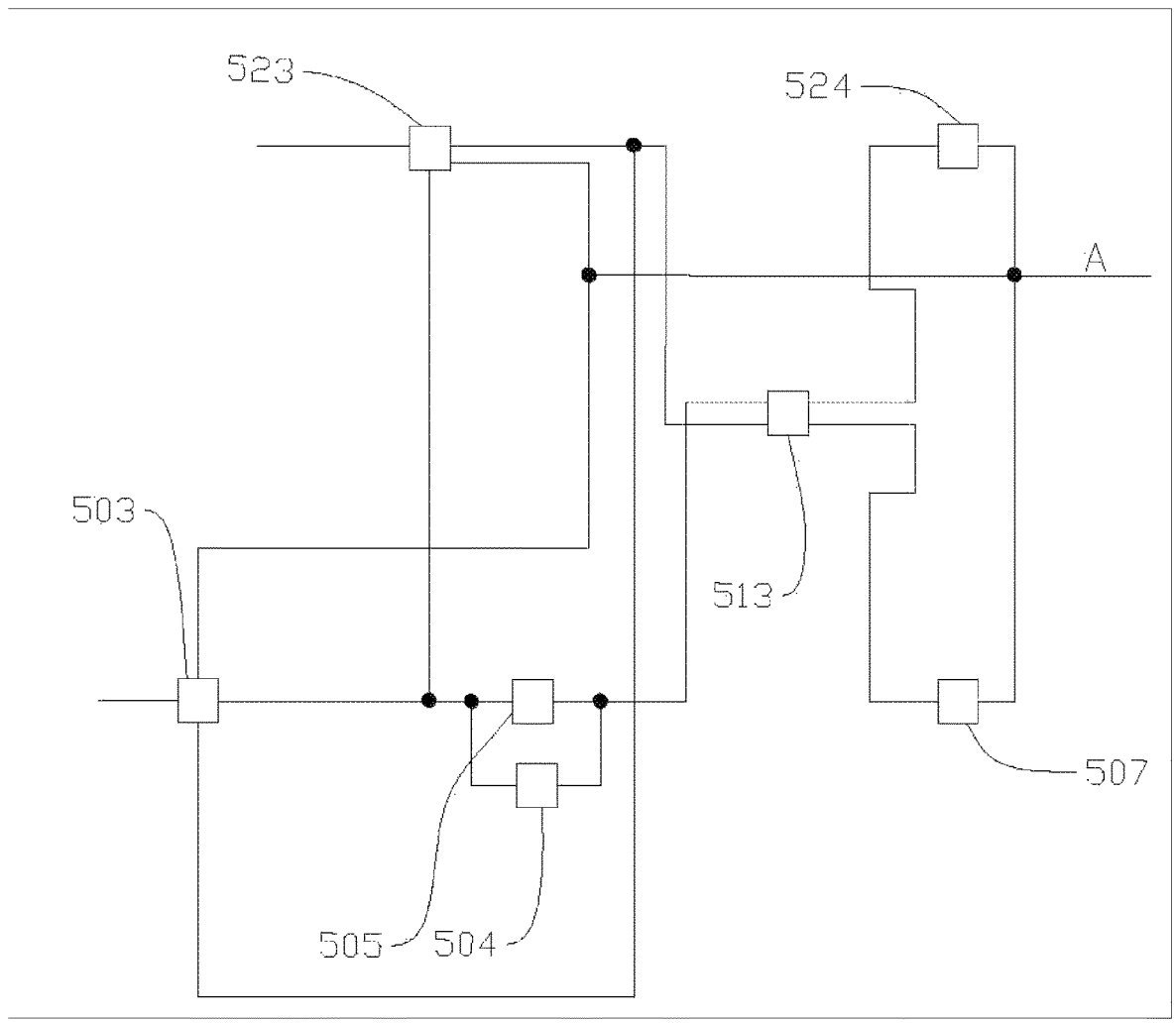
FIG. 4 is a schematic view showing the connection among the load balancing valves and the reversing valve shown in FIG. 3.
Figure 5:
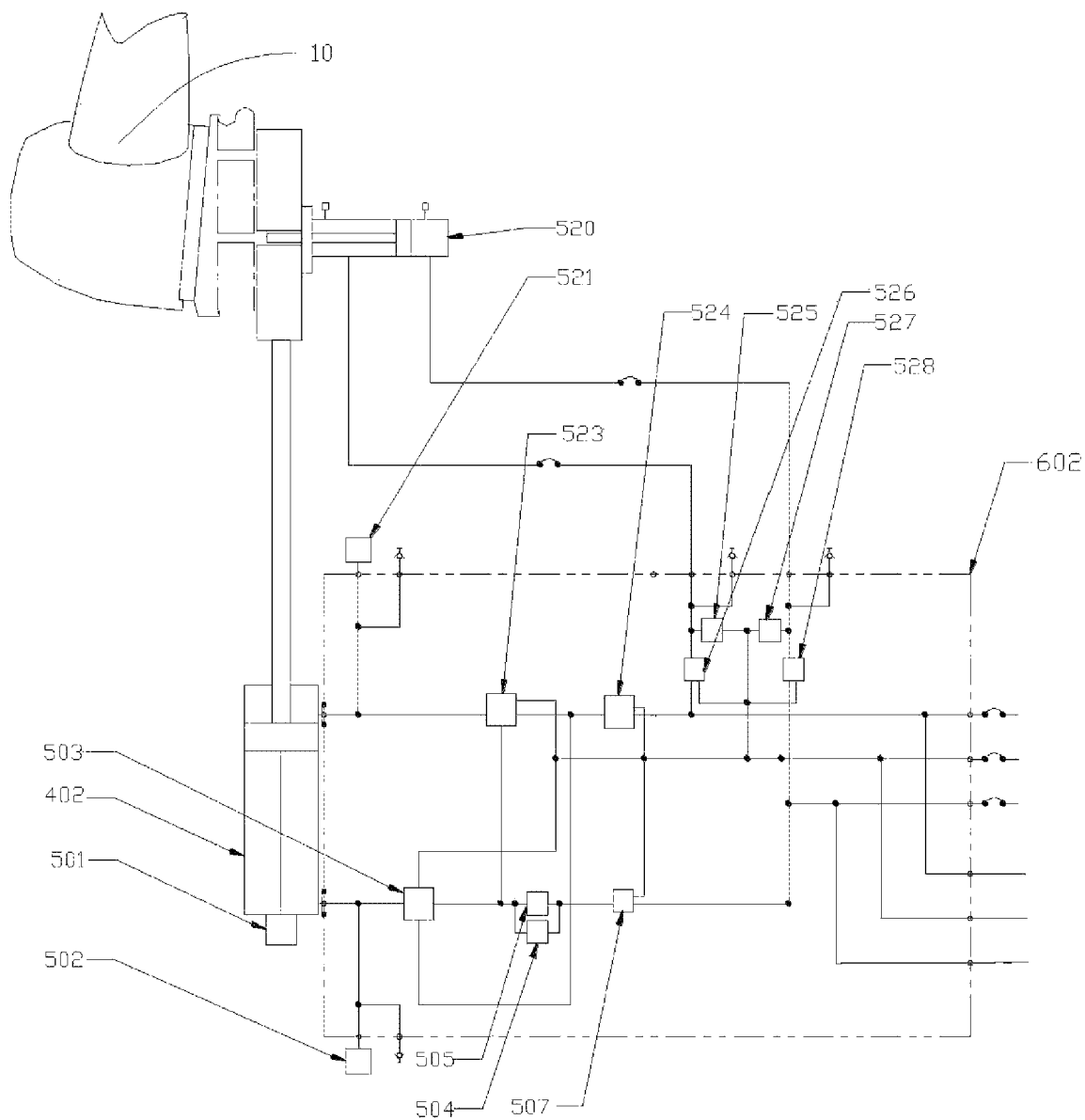
FIG. 5 is a principle view of the tension hydraulic cylinder and its control unit shown in FIG. 2.
Figure 6:
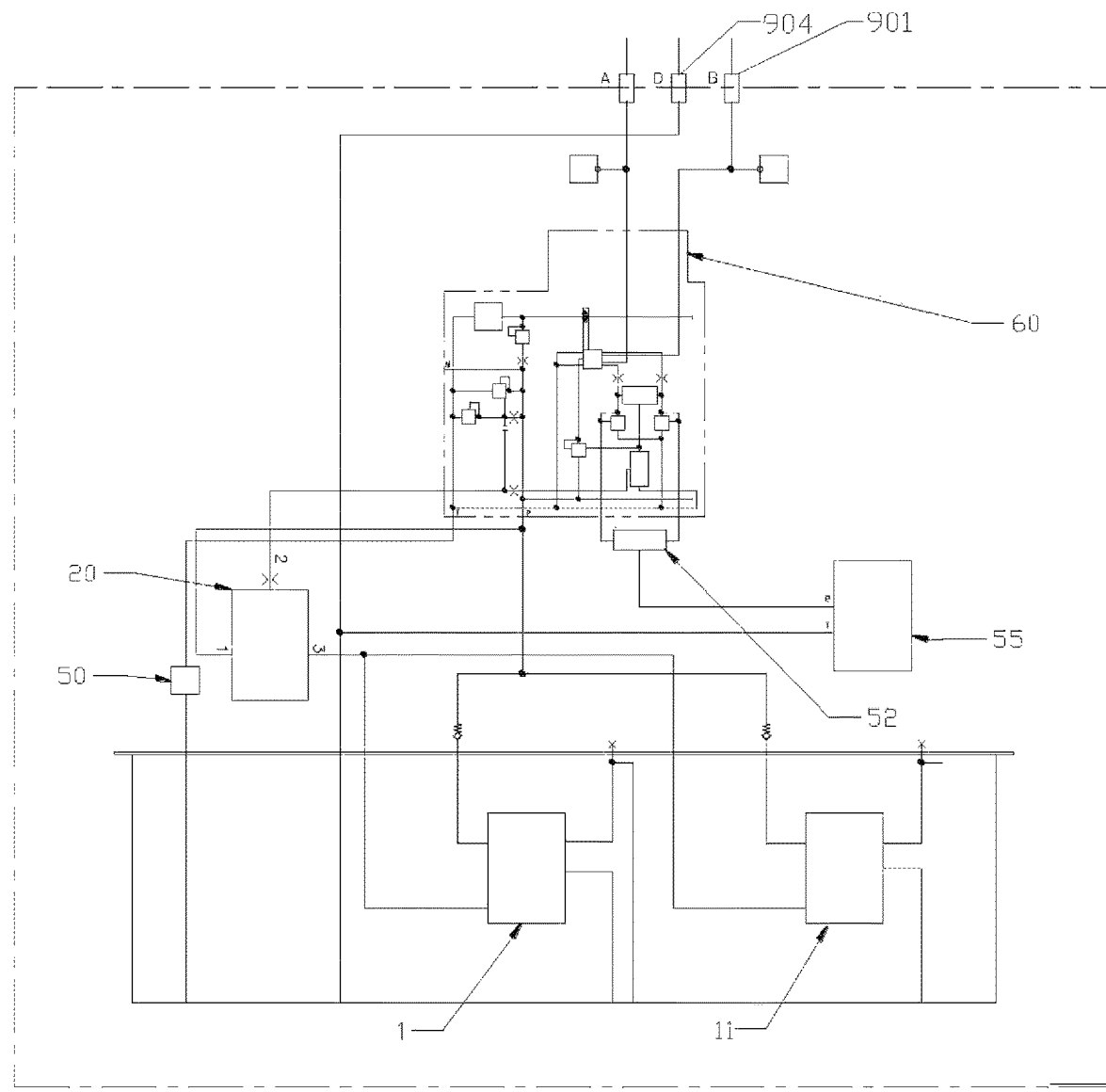
FIG. 6 is a schematic structural view of the hydraulic station shown in FIG. 2.

FIG. 3 is a principle view of the thrust hydraulic cylinder 401 and its control unit shown in FIG. 2, FIG. 4 is a schematic view showing connection among a load balancing valve 523, a load balancing valve 503 and a reversing valve 513 shown in FIG. 3, and FIG. 5 is a principle view of the tension hydraulic cylinder 402 and its control unit (i.e., second control unit 200) shown in FIG. 2, and FIG. 6 is a schematic structural view of the hydraulic station 900 shown in FIG. 2.

The thrust hydraulic cylinder 401 is used to drive the impeller 10 to rotate, and the first cylinder-side valve block 601 is a hydraulic control valve block for the thrust hydraulic cylinder 401 and the locking hydraulic cylinder 406. A plurality of valves are disposed in the first control unit 100.

A load balancing valve 552, a reversing valve 507, a reversing valve 513, a pressure reducing valve 505, and a load balancing valve 503 are sequentially connected to form an oil line for the godless cavity side of the thrust hydraulic cylinder 401. A check valve 504 is also connected in parallel with the pressure reducing valve 505, and the check valve 504 is opened when oil enters into godless cavity. Further, pressure sensors 502 and 521 are respectively provided at the inlet and outlet of the thrust hydraulic cylinder 401, and a displacement sensor 501 is provided on the cylinder body for detecting the displacement of the piston rod. The reversing valve 507 and the reversing valve 513 are two-position four-way electromagnetic reversing valves. In the present embodiment, the pressure reducing valve 505 is a fixed differential pressure reducing valve. Alternatively, the pressure reducing valve 505 may also be a fixed ratio pressure reducing valve, or the pressure reducing valve 505 may also be a fixed value pressure reducing valve. A load balancing valve 523, the reversing valve 513, a reversing valve 524, and a load balancing valve 551 are sequentially connected to form an oil line for the rod cavity side of the thrust hydraulic cylinder 401. The reversing valve 524 is a two-position four-way electromagnetic reversing valve.

The above arrangement is configured such that load balancing valves are respectively provided in the oil line for the godless cavity and the oil line for the rod cavity of the thrust hydraulic cylinder 401, wherein the load balancing valve in the oil line for the rod cavity can be opened by high-pressure oil in the oil line for the godless cavity, and the load balancing valve in the godless oil line for the godless cavity can be opened by high-pressure oil in the oil line for the rod cavity.

A fourth reversing valve 526, a fifth reversing valve 528, a safety valve 525, a safety valve 527, a load balancing valve 551, and a load balancing valve 552 are connected to form a control oil line of the locking hydraulic cylinder 406. The safety valve 525 and the safety valve 527 are both overflow valves. When the pressure in the rod cavity or the godless cavity of the locking hydraulic cylinder 406 is too high, overflow may be achieved through one of the two overflow valves, and the overflow oil may be returned to the oil tank through the oil return pipeline D.

The above valves are mounted and connected by the first cylinder-side valve block 601. The first cylinder-side valve block 601 is connected to the hydraulic station 900 through the oil supply pipeline A, the oil supply pipeline B and the oil return pipeline D. The pipe connection is achieved by a tubing inlet port quick plug 901 and a tubing inlet port quick plug 904. The usage of the tubing inlet port quick plug 901 and the tubing inlet port quick plug 904 facilitates quick installation and disassembly at the site, improves work efficiency, while reducing environmental pollution resulting from oil leakage during installation and disassembly.

The second control unit 200 of the tension hydraulic cylinder 402 is substantially the same as the first control unit 100, except that the second cylinder-side valve block 602 is not provided with the load balancing valve 551, the load balancing valve 552, and the reversing valve 513 in the first cylinder-side valve block 601. The oil inlet pipeline of the second control unit 200 is connected in series after the load balancing valve 551 and the load balancing valve 552, and therefore, the two balancing valves can also ensure the safety of the system of the second control unit 200.

In addition, in the second control unit 200, the load balancing valve 503 and the load balancing valve 523 are respectively provided on the godless cavity side and the rod cavity side of the tension hydraulic cylinder 402. The load balancing valve 523 in the oil line for the rod cavity may be opened by high-pressure oil in the oil line for the godless cavity, and the load balancing valve 503 in the oil line for the godless cavity may be opened by high-pressure oil in the oil line for the rod cavity.

The third control unit 300, the fourth control unit 400, and the fifth control unit 500 that respectively control the thrust hydraulic cylinder 403, the thrust hydraulic cylinder 404, and the tension hydraulic cylinder 405 have the same structure as the second control unit 200. That is, the second cylinder-side valve block 602, the third cylinder-side valve block, the fourth cylinder-side valve block, and the fifth cylinder-side valve block have the same structure.

The control of the locking hydraulic cylinder 407, the locking hydraulic cylinder 408, the locking hydraulic cylinder 409, and the locking hydraulic cylinder 410 is similar to the control of the locking hydraulic cylinder 406.

The hydraulic station 900 is used to supply high-pressure oil to each hydraulic cylinder. The hydraulic station 900 includes two load-sensitive variable pumps 1 and 11, a pump-side valve block 60, a flow compensating valve 20, a shuttle valve 52, a pressure setting valve block 55, a check valve 50 for oil return pipe, and an oil tank. A proportional servo reversing valve is provided in the pump-side valve block 60 for adjusting the output flow of the pump station. The flow compensating valve 20 feeds the output flow required by the pump-side valve block 60 (i.e., the flow required by the load) back to the control module of the load-sensitive variable pumps 1 and 11, so that the load-sensitive variable pumps 1 and 11 can adjust the displacement of the pump according to the flow required by the load, so as to match the output flow of the pump with the flow required by the system, thereby reducing power consumption of the system and heat generation and improving efficiency.

The pump-side valve block 60 may set the maximum operating pressure of the system through the shuttle valve 52 and two different overflow circuits within the pressure setting valve block 55. The two load-sensitive variable pumps 1 and 11 are small flow pumps, both of which provide the flow required for the normal operation of the system. The load-sensitive variable pumps 1 and 11 are identical in structure and may be used alternately. That is, when one of the pumps fails, the other of the pumps can provide half of the flow required for the normal operation of the system. As such, it can ensure that the system continues to work by reducing the rotational speed of the generator rotor, thereby improving the reliability of the system and ensuring the safety when the direct-driven wind generator set adopts the barring mode for single blade lifting.

The high-pressure oil outlet of the hydraulic station 900 is connected to the first cylinder-side valve block 601, which is equivalent to the case where the load balancing valve 551 and the load balancing valve 552 are provided after the high-pressure oil outlet. When the oil pipe connected between the first cylinder-side valve block 601 and the hydraulic station 900 is broken, the pressure in the oil inlet pipe is lowered, and when the pressure is lower than the minimum opening pressure of the load balancing valve 551 and the load balancing valve 552, the two load balancing valve are in a closed state, so that the pressure in the oil line in the hydraulic circuit on the cylinder-side is not instantaneously lost, thereby improving the safety of the system.

Optionally, the reversing valve 513 may be disposed in the oil line for the godless cavity and the oil line for the rod cavity of the tension hydraulic cylinder, and the flow directions of hydraulic oil in the oil line for the godless cavity and the oil line for the rod cavity of the tension hydraulic cylinder can be simultaneously converted through the operation of the reversing valve 513..

In addition, the number of the reversing valves 513 may also be three, that is, the oil lines of the three thrust hydraulic cylinders are provided with the reversing valves, respectively.

The present embodiment and its advantageous effects will be further described below by taking the operating process of the thrust hydraulic cylinder 401 and the locking hydraulic cylinder 406 as an example.

The hydraulic circuit controlled by the elongation of the piston rod of the thrust hydraulic cylinder 401 is as follows: the hydraulic station 900 supplies oil to the oil supply pipeline A, and the high-pressure oil in the oil supply pipeline A enters into the first cylinder-side valve block 601 through the one-way valve of the load balancing valve 552. Meanwhile, the high-pressure oil triggers the operation of load balancing valve 551 to switch the load balancing valve 551. At this time, the coil of the reversing valve 507 is energized, and the high-pressure oil passes through the reversing valve 507. The high-pressure oil then passes through the reversing valve 513, and then passes through the pressure reducing valve 505 and is thus depressurized. The depressurized oil enters into the godless cavity of the thrust hydraulic cylinder 401 through the load balancing valve 503, and drives the piston rod to elongate. Meanwhile, the high-pressure oil depressurized by the pressure reducing valve 505 triggers the operation of the load balancing valve 523 to allow the return oil from the rod cavity of the thrust hydraulic cylinder 401 to pass through. Specifically, the return oil flows through the load balancing valve 523, the reversing valve 513, the reversing valve 524, and finally back to the oil tank via the oil return pipeline D.

The hydraulic circuit controlled by the retraction of the piston rod of the thrust hydraulic cylinder 401 is as follows: the hydraulic station 900 supplies oil to the oil supply pipeline B, and the high-pressure oil in the oil supply pipeline B enters into the first cylinder-side valve block 601 through the one-way valve of the load balancing valve 551. Meanwhile, the high-pressure oil triggers the load balancing valve 552 to switch the load balancing valve 552. At this time, the coil of the reversing valve 524 is energized, and the high-pressure oil passes through the reversing valve 524. The high-pressure oil then passes through the reversing valve 513, the load balancing valve 523, and the rod cavity of the thrust hydraulic cylinder 401 to push the piston rod to retract. At the same time, the high-pressure oil passing through the reversing valve 513 triggers the operation of the load balancing valve 503 to allow the oil from the godless cavity of the thrust hydraulic cylinder 401 to pass through. Specifically, the return oil flows through the load balancing valve 503, the check valve 504, and the oil return pipeline D back to the oil tank.

The reversing valve 513 is used for switching control when load is changed abruptly. When the reversing valve 513 is operated, the directions of the two oil lines passing through the valve spools thereof are interchanged. That is, the high-pressure oil that originally intends to enter into the godless cavity of the thrust hydraulic cylinder 401 enters into the rod cavity while the oil from the godless cavity reflows, thereby changing the direction of force applied by the thrust hydraulic cylinder 401 and ultimately changing the direction of the applied torque. This function can be applied to the case where load is changed abruptly. For example, when the blade of the impeller rotates through the vertical position, the direction of the torque applied to hub by the gravity of the blade changes suddenly. At this time, the direction of the torque applied by the thrust hydraulic cylinder 401 also changes to the reverse direction, which is equivalent to the case where a resistance is in advance applied, thereby improving the ability of system to resist abrupt change in load and making the system more stable during overload occurred when the load is abruptly changed.

Moreover, the pressure reducing valve 505 disposed on the godless cavity side of the thrust hydraulic cylinder 401 can reduce pressure of the hydraulic oil when the hydraulic oil enters into the godless cavity, so that the pushing force provided by thrust hydraulic cylinder 401 is the same as the pulling force providing by the tension hydraulic cylinder 402 and the tension hydraulic cylinder 405. As such, the force generated by the godless cavity of the thrust hydraulic cylinder 401 is the same as the force generated by the rod cavity of the tension hydraulic cylinder 40 and the tension hydraulic cylinder 405, thereby ensuring that the five hydraulic cylinders can generate the same force whether in a pushing state or in a pulling state, so as to prevent deformation of the generator end cover from being inconsistent due to the difference in the forces acting on the rotor of the generator.

In addition, when the pressure in the rod cavity or the godless cavity of the thrust hydraulic cylinder 401 is too high, oil will overflow into the oil tank through the bypass overflow valve inside the load balancing valve 503 or the load balancing valve 523, to ensure the safety of the system. The displacement sensor 501 is used to detect the displacement of the piston rod of the thrust hydraulic cylinder 401. The reversing valve 507 and the reversing valve 524 are provided with displacement sensors for detecting the position of the valve spool.

Further, in the two oil lines for driving the thrust hydraulic cylinder 401, the load balancing valve 503 and the load balancing valve 523 are provided. When leakage in the oil line causes the system pressure lower than the opening pressure of the load balancing valve 503 and the load balancing valve 523, the two load balancing valves 503 and 523 will be in a closed state, so that the hydraulic oil in the hydraulic cylinder cannot be removed, so as to keep the position of the generator rotor unchanged, to avoid major accidents such as blade breakage, to win time for troubleshooting, and to improve the safety of the system.

Similarly, in the first cylinder-side valve block 601, the load balancing valve 551 and the load balancing valve 552 are provided. When the oil pipe connected between the first cylinder-side valve block 601 and the hydraulic station 900 is broken, the pressure in the oil inlet pipe is lowered, and when the pressure is lower than the minimum opening pressure of the load balancing valve 551 and the load balancing valve 552, the two load balancing valve will be in a closed state, so that the pressure in oil line in the hydraulic circuit on the hydraulic cylinder side is not instantaneously lost, thereby improving the safety of the system.

The hydraulic circuit controlled by the locking operation of the locking hydraulic cylinder 406 is as follows: the proportional reversing valve in the pump-side valve block 60 is switched to cause the high-pressure oil to enter into the oil supply pipeline A and also to cause the electromagnetic coil of the fifth reversing valve 528 to be energized. As such, the high-pressure oil in the oil supply pipeline A enters into the godless cavity of the locking hydraulic cylinder 406 through the fifth reversing valve 528, thereby driving the piston rod to elongate and to insert the locking pin into the locking holes 802 disposed on the end face of the generator rotor 801. At the same time, the oil from the rod cavity may be returned to the oil tank through the fourth return valve 526 via the return pipeline D.

The hydraulic circuit controlled by the pull-out operation of the locking hydraulic cylinder 406 is as follows: after the high-pressure oil is supplied into the oil supply pipeline B and the electromagnetic coil of the fourth reversing valve 526 is energized, the high-pressure oil enters from the fourth reversing valve 526 into the rod cavity to retract the piston rod and pull out the locking pin. The oil from the godless cavity returns to the oil tank through the fifth reversing valve 528 and the oil return pipeline D. The safety valves 527 and 525 are pressure relief valves that ensure the safety of the locking pin hydraulic circuit. That is, when the pressure in the oil line of the godless cavity side or the rod cavity side is too high, hydraulic oil may overflow through one of the two overflow valves, and returns to the oil tank via the oil return pipeline D.

The disclosure also provides a driving method capable of driving the impeller to rotate. The driving method may be implemented by any one of the hydraulic driving systems of the foregoing embodiments. Here, an embodiment of the hydraulic driving system shown in FIGS. 1 to 6 will be described as an example.

The driving method may drive the impeller of the wind generator set to rotate or maintain stationary at a predetermined position (such as an impeller installing position), which may be implemented during installation of the blade of the impeller. After the hub of the impeller is installed in position, the three blades are to be installed in sequence. During the installation process, it is required to rotate the hub or the hub with the blades installed. When the impeller rotates through the vertical direction, the direction of the torque applied to the hub by the gravity of the blades changes. The disclosure may change the direction of the torque provided by the thrust hydraulic cylinder 401 by driving the reversing valve 513, so as to counteract the sudden change in the torque applied to the hub by the gravity of the blades, and thereby making the rotation smoother.

Figure 7:
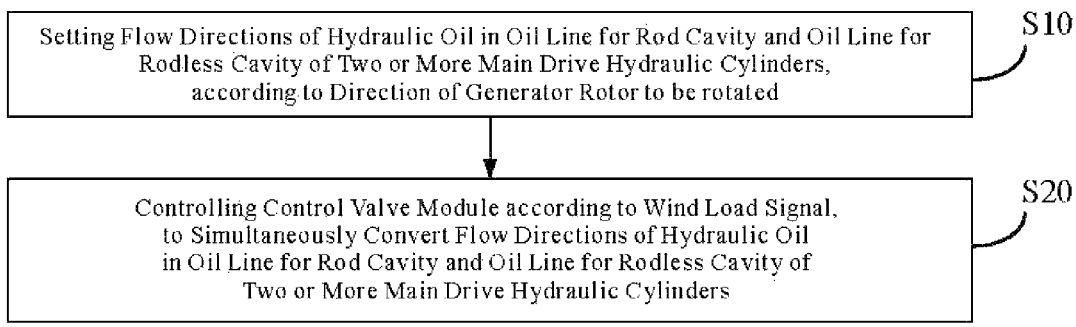
FIG. 7 is a flowchart showing a driving method according to an embodiment of the disclosure.

Referring to FIG. 7, the driving method according to the disclosure includes: Step S10, setting the flow directions of the hydraulic oil in the oil line for the rod cavity and the oil line for the godless cavity of two or more main drive hydraulic cylinders, according to the direction of the generator rotor to be rotated; Step S20, controlling the control valve module according to the wind load signal, to simultaneously convert the flow directions of the hydraulic oil in the oil line for the rod cavity and the oil line for the godless cavity of two or more main drive hydraulic cylinders.

It can be understood that the driving method further includes acquiring the relative displacement amount of the main drive hydraulic cylinder, and controlling the main drive hydraulic cylinder to stop operating when the relative displacement amount reaches a predetermined threshold.

The acquiring the relative displacement amount of the main drive hydraulic cylinder includes: monitoring the current displacement amount of the piston rod of the main drive hydraulic cylinder; comparing the current displacement amount with the displacement amount in an initial state of the main drive hydraulic cylinder to acquire the relative displacement amount of the main drive hydraulic cylinder.

Figure 8:
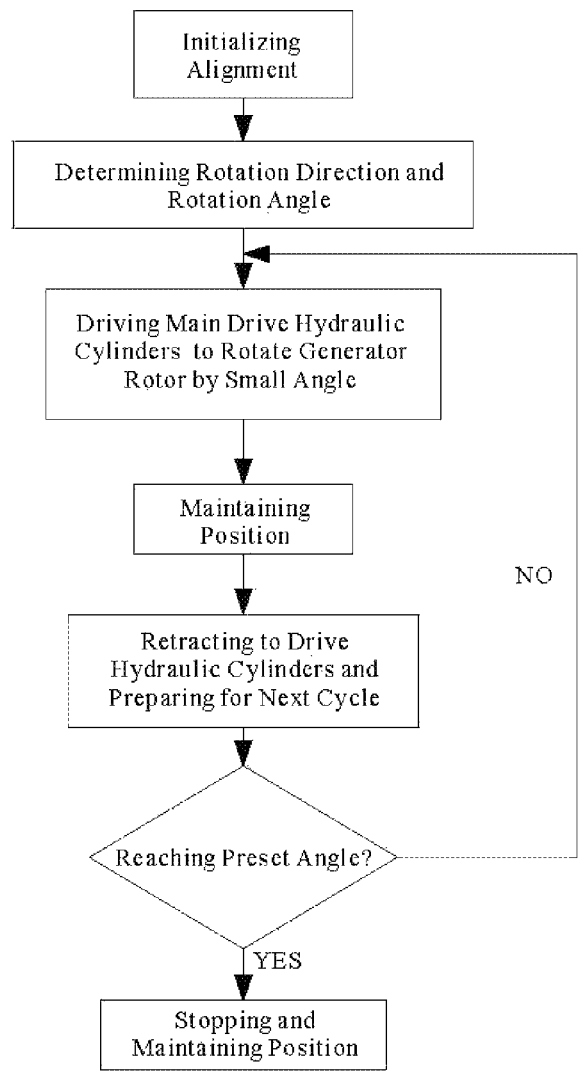
FIG. 8 is a flowchart showing a specific example of the driving method for barring shown in FIG. 7.
Figure 9:
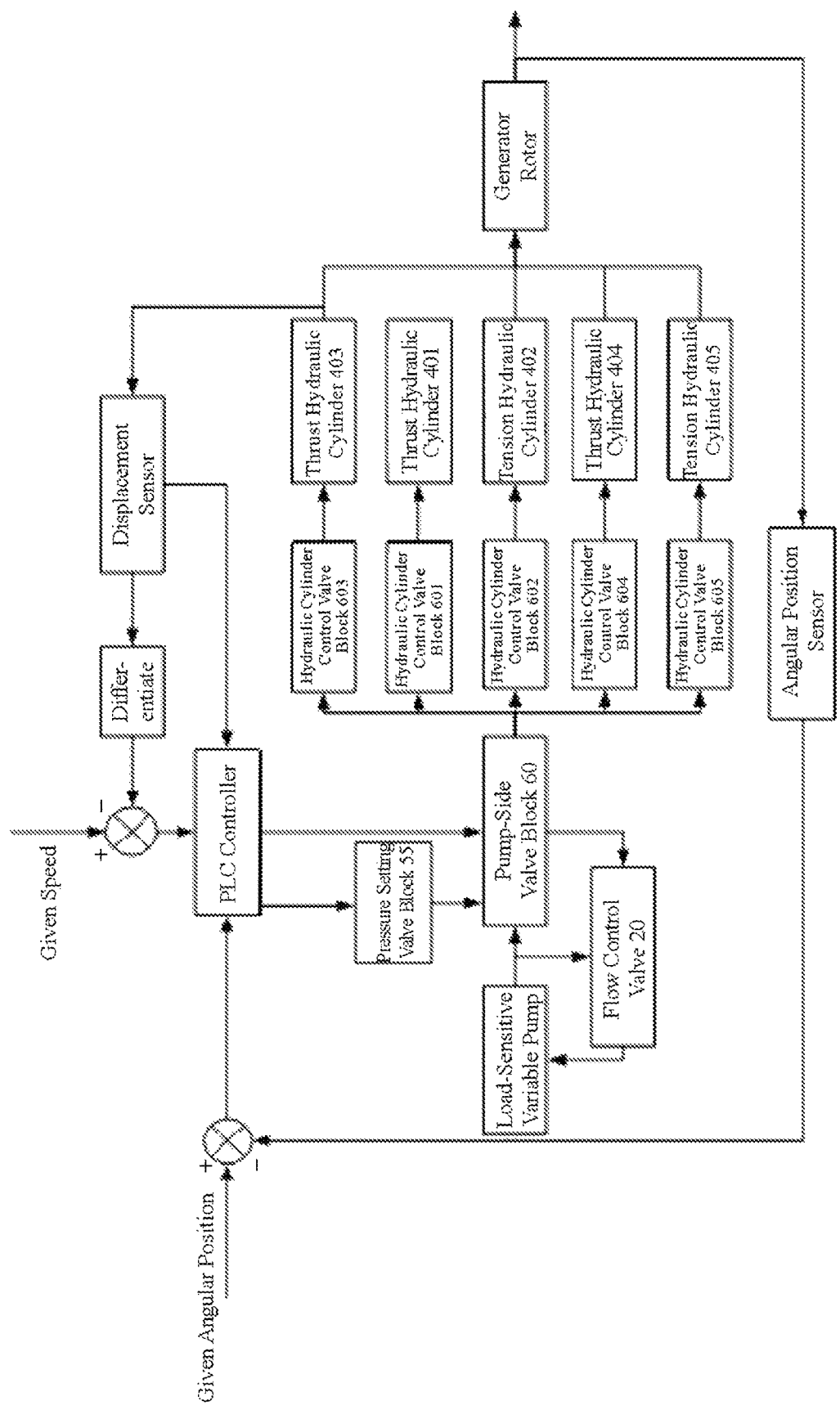
FIG. 9 is a block view showing the rotation control of the hydraulic driving system for barring shown in FIG. 1.

FIGS. 8 and 9 are flowcharts showing a driving method for driving the impeller to rotate according to a specific example. The driving method may be controlled by a control device such as a PLC or a single chip microcomputer, which includes the following steps.

S10, initializing alignment.

a) At this time, the locking pin of the locking hydraulic cylinder is not aligned with the locking hole 802, and the thrust hydraulic cylinder 403 at the intermediate position shall be manually operated to elongate and retract to drive the third slide carriage 705 to slide the locking hydraulic cylinder 408 along the guide track of the main structure 700 of the barring device, so that the locking pin of the locking hydraulic cylinder 408 is aligned with the locking hole. When the locking pin is aligned with the locking hole, the locking hydraulic cylinder 408 is driven to insert the locking pin into the locking hole. The control device records the displacement amount of the piston rod of the thrust hydraulic cylinder 403 during this process.

b) Referring to the displacement amount of the thrust hydraulic cylinder 403, the control device calculates the elongation or retraction amount of the remaining thrust hydraulic cylinders or the tension hydraulic cylinders, and inserts the remaining locking pins into the locking holes on the generator rotor 801.

S20, determining rotation direction and rotation angle.

The hydraulic driving system has a clockwise mode and a counterclockwise mode depending on the situation. When the generator rotor 801 is faced from the side of the base 800, the generator rotor 801 is desired to use the clockwise mode, in which the piston rods of the thrust hydraulic cylinder 401, the thrust hydraulic cylinder 403, and the thrust hydraulic cylinder 404 are elongated, and the piston rods of the tension hydraulic cylinder 402 and the tension hydraulic cylinder 405 are retracted. In the counterclockwise mode, the oil inlet directions and the oil outlet directions of the above five hydraulic cylinders are exchanged, and the directions of the driving forces are thus changed. In other words, the functions of the thrust hydraulic cylinder 401, the thrust hydraulic cylinder 403, the thrust hydraulic cylinder 404, the tension hydraulic cylinder 402, and the tension hydraulic cylinder 405 are interchanged.

The control device may calculate the rotation angle of the generator rotor 801 according to the angular position that the generator rotor 801 is to be reached and the initial angular position of the generator rotor fed back by the angular displacement sensor.

S30, driving main drive hydraulic cylinders to rotate a generator rotor by a small angle The hydraulic cylinder has a limited stroke, so the hydraulic driving system cannot rotate the generator rotor 801 in place at one time but by multiple rotation driving, and each driving may only rotate the generator rotor by a small angle. Moreover, the control device may also calculate the cycle number n required for the generator rotor 801 to be rotated to a predetermined angular position in conjunction with the angle at which each cycle of the hydraulic driving system can be rotated.

The thrust hydraulic cylinder 403 in the intermediate position is taken as an example. The control device may acquire the current position information and the position information in the initial state of the displacement sensor 501 mounted on the cylinder body of the hydraulic cylinder, and compare the two position information to acquire the relative displacement amount. The control device then compares the relative displacement amount with a preset relative displacement amount. If the preset relative displacement amount is reached, the control device closes the proportional reversing valve in the pump-side valve block 60, and the reversing valve 507 and the reversing valve 524 in the third cylinder-side valve block, to stop the hydraulic cylinder from being driven.

S40, maintaining position.

When the generator rotor 801 is rotated by a small angle, its position should be maintained, so as to facilitate the hydraulic driving system to prepare for the next driving.

The load balancing valve 523 and the load balancing valve 503 are mounted at the outlets of the rod cavity and the godless cavity of the thrust hydraulic cylinder 403, therefore, when the two load balancing valve 523 and 503 are in a closed state, the hydraulic oil may be enclosed in the hydraulic cylinder. Therefore, torque loads resulting from gravity of the blades of the impeller, gravity of the generator and wind can be resisted.

S50, retracting the main drive hydraulic cylinders and preparing for the next cycle.

After the generator rotor 801 is rotated by a small angle, the hydraulic driving system is stopped to be driven, and the cycle number recorder in the control device adds one. The locking hydraulic cylinder 406 pulls the locking pin out, and the thrust hydraulic cylinder 401 pulls locking pin out back to the initial position and relocks it. According to the above manner, each of the thrust hydraulic cylinders or the tension hydraulic cylinders are sequentially retracted, and the retracted position may be determined by the initial position recorded in the control device. For each retraction, the control valve block of the retracted hydraulic cylinder is only required to be opened, and the control valve blocks of the other hydraulic cylinders are in the closed state. In this process, the generator rotor is always locked by at least four locking pins, so that the generator rotor is forced more uniformly and has small deformation degree.

When the thrust hydraulic cylinders and the tension hydraulic cylinders are retracted into position, the control device compares the signal of the angular displacement sensor mounted on the generator with the given angular position signal, to determine whether the preset angle is reached. When the determination result is "NO", the next driving operation is started. When the determination result is "YES", the control device sends a signal to close the pump-side valve block 60 and the control valve blocks of the thrust hydraulic cylinders and the tension hydraulic cylinders, so that the entire hydraulic control system enters into a position maintaining mode. At the same time, the control device records the current displacement amount L3 of the thrust hydraulic cylinder 403 for judging changing in the position.

During the above operation, the blades may pass through the vertical position, and the direction of torque applied to the generator rotor by the gravity of the blades will change. Therefore, the load on the generator rotor 801 is abruptly changed during the rotation of the blade from $(90° -\Delta)$ to $(90° +\Delta)$ or from $(90° +\Delta)$ to $(90° -\Delta)$. When the load is abruptly changed, the barring device of the generator may be impacted, which causes large deformation of the generator, affects the electromagnetic air gap of the generator, and causes the blade to vibrate. The embodiment of the disclosure solves this problem in the following manner. When the control device detects that the blade is at the position between $(90° -\Delta) \sim 90°$ or $90° -(90° +) (\Delta \leq 5°)$ and the blade is rotating towards the 90° position, the control device sends a signal to the reversing valve 513 in the first cylinder-side valve block 601 of the thrust hydraulic cylinder 401 to switch the oil line, so as to change the direction of force applied by the thrust hydraulic cylinder 401. That is, the direction of the force applied by the thrust hydraulic cylinder 401 is opposite to the direction of the torque applied to the generator rotor after the blade passes through the 90° position, which is equivalent to the case where a resistance is applied in advance, thereby improving the ability of the system to resist abrupt change in load and making the system more stable during overload occurred when the load is changed abruptly.

There exists a slight leakage in the hydraulic valve, and there exists a slight internal leakage in the piston within the hydraulic cylinder. Under the gravity of the blade and the torque load generated by the wind, the elongation length of the piston rod changes, resulting in change of the angular position of the generator rotor. The driving method according to the embodiment of the disclosure may monitor the displacement amount of the impeller due to leakage of the hydraulic system when the impeller remains stationary at a predetermined position, and drive the thrust hydraulic cylinders and/or the tension hydraulic cylinders to restore to the original state when the displacement amount exceeds a predetermined threshold. That is, the control device compares the signal which is fed back by the displacement sensor 501 disposed on the thrust hydraulic cylinder 403 with the previously recorded displacement amount L3 for every few seconds. If the difference exceeds the preset value, the oil is replenished to the thrust hydraulic cylinder 403 to reduce small difference, thereby maintaining the angular position of the generator rotor. If the difference is less than the preset value, the replenishment action is stopped and the corresponding control valve signal is turned off. Moreover, the displacement amount of the impeller is acquired by monitoring the displacement amount of the piston rods of the thrust hydraulic cylinders and/or the tension hydraulic cylinders. Such acquired displacement amount is more accurate than the displacement amount acquired by detecting the signal of the angular displacement sensor mounted on the generator, and can also reduce the precision required for the angular displacement sensor and reduce the cost.

Additionally, the control device may send a command to the pressure setting valve block 55 to set the maximum operating pressure of the system and calculate the speed at which the hydraulic cylinder is elongated or retracted based on the designed rotation speed. Specifically, the opening size of the proportional reversing valve in the pump-side valve block 60 is pre-stored in the control device, and a corresponding control signal is sent to the pump-side valve block 60 to set the flow at the outlet of the hydraulic station 900. The flow compensating valve 20 compares the flow at the outlet of the proportional valve in the pump-side valve block 60 with the flow at the outlet of the pumps, and sends the compared signal to the pump-side control modules of the load-sensitive variable pumps 1 and 11. When the flow required by the load is less than the flow at the outlet of the pumps, the displacement of the load-sensitive variable pumps 1 and 11 can be reduced by the flow compensating valve 20 to adapt to the load requirement, thereby reducing power consumption of the system; and vice versa.

Further, the speed control of the generator rotor 801 may be realized by controlling the speed of the piston rods of the thrust hydraulic cylinders and the tension hydraulic cylinders. Hereinafter, the displacement sensor 501 on the thrust hydraulic cylinder 403 will be described as one example. The control device may differentiate the displacement signal into a speed and compare the acquired speed with a movement speed of the piston rod to calculate a difference, then calculate an adjustment amount of the opening size of the proportional reversing valve in the pump-side valve block 60 according to the difference, and issue an adjustment signal to the proportional reversing valve in the pump-side valve block 60 to adjust the opening size of the valve, thereby controlling the flow of the hydraulic system, keeping the difference between the speed of the hydraulic cylinder and the given value within a certain range, reducing power consumption and thermal value of the system, improving environmental and temperature adaptability of the system.

As above, the hydraulic driving system and the driving method according to the embodiments of the disclosure can change the direction of the acting force of at least one of the hydraulic cylinders through the reversing valve, and therefore can controllable make an abrupt change in the power provided by the hydraulic driving system, thereby coping with the abrupt change of load in the actual working condition, reducing the vibration shock of the system, and making the driving process smoother and safer.

The disclosure may be embodied in other specific forms without departing from the spirit and essential characteristics. Therefore, the above embodiments shall be considered as illustrative rather than restrictive, the scope of the disclosure is defined by the appended claims rather than the above description, and thus all changes falling within the scope of the meaning and the equivalents of the claims are included in the scope of the disclosure. In addition, different technical features appearing in different embodiments may be combined to achieve beneficial effects. Other variations of the disclosed embodiments shall be understood and implemented by the person skilled in the art upon studying the drawings, specification and claims.

What is claimed is:

1. A hydraulic driving system for barring for use in a wind generator set, the wind generator set comprising a nacelle, a generator, and an impeller, and the impeller comprising a hub and blades, characterized in comprising:
    three or more main drive hydraulic cylinders, which are divided into two groups to provide pulling and pushing forces to a driven impeller, each main drive hydraulic cylinder including a cylinder body and a piston rod which is disposed within the cylinder body to divide the cylinder body into a rod cavity and a rodless cavity, wherein an oil line for the rod cavity and an oil line for the rodless cavity of each main drive hydraulic cylinder are controlled by a same control valve module, and the control valve module of at least one of the main drive hydraulic cylinders comprises a reversing valve which is connected to the oil line for the rod cavity and the oil line for the rodless cavity; and
    a control device, which is configured to:
        detect a rotation direction and a rotation position of the hub; and
        send a signal to the reversing valve of the control valve module according to the rotation direction and the rotation position of the hub, to simultaneously convert flow directions of hydraulic oil in the oil line for the rod cavity and the oil line for the rodless cavity of at least one of the three or more main drive hydraulic cylinders, wherein
    at least one of the three or more main drive hydraulic cylinders is provided with a displacement sensor which is used to detect displacement of the piston rod.

2. The hydraulic driving system for barring according to claim 1, wherein the control valve module of each main drive hydraulic cylinder comprises a pressure reducing valve which is disposed in the oil line for the rodless cavity, and the pressure reducing valve reduces pressure of the hydraulic oil when the hydraulic oil enters into the oil line for the rodless cavity.

3. The hydraulic driving system for barring according to claim 2, wherein the pressure reducing valve is a fixed difference pressure reducing valve or a fixed ratio pressure reducing valve.

4. The hydraulic driving system for barring according to claim 1, wherein the control valve module of each main drive hydraulic cylinder comprises load balancing valves which are respectively disposed in the oil line for the rodless cavity and the oil line for the rod cavity, and wherein, the load balancing valve in the oil line for the rod cavity is disposed to be opened by high-pressure oil in the oil line for the rodless cavity, and the load balancing valve in the oil line for the rodless cavity is disposed to be opened by high-pressure oil in the oil line for the rod cavity.

5. The hydraulic driving system for barring according to claim 1, wherein load balancing valves are respectively disposed on a rodless cavity side and a rod cavity side of each main drive hydraulic cylinder, and wherein, the load balancing valve on the rod cavity side is disposed to be opened by high-pressure oil in the oil line for the rodless cavity, and the load balancing valve on the rodless cavity side is disposed to be opened by high-pressure oil in the oil line for the rod cavity.

6. The hydraulic driving system for barring according to claim 1, further comprising a hydraulic station for supplying high-pressure oil, wherein load balancing valves are disposed after a high-pressure oil outlet of the hydraulic station.

7. The hydraulic driving system for barring according to claim 6, wherein the hydraulic station comprises two flow pumps, which are used to simultaneously supply the hydraulic oil to the system, alternatively, one of which is used to supply the hydraulic oil to the system.

8. The hydraulic driving system for barring according to claim 7, wherein the two flow pumps are load-sensitive variable displacement pumps.

9. The hydraulic driving system for barring according to claim 1, wherein the number of the three or more main drive hydraulic cylinders is five, and the five main drive hydraulic cylinders are sequentially distributed as a thrust hydraulic cylinders, a tension hydraulic cylinder, a thrust hydraulic cylinder, a thrust hydraulic cylinder, and a tension hydraulic cylinder.

10. The hydraulic driving system for barring according to claim 9, wherein the thrust hydraulic cylinders and the tension hydraulic cylinders have the same driving direction.

11. The hydraulic driving system for barring according to claim 9, wherein the main drive hydraulic cylinder drives a slide carriage through the piston rod such that a locking pin is aligned with a locking hole.

12. A driving method for barring, which is used to drive an impeller of a wind generator set to rotate and maintain stationary at a predetermined position by the hydraulic driving system for barring according to claim 1, characterized in that the driving method comprises:
  setting flow directions of hydraulic oil in the oil line for the rod cavity and the oil line for the rodless cavity of the three or more main drive hydraulic cylinders according to a direction to be rotated by a generator rotor;
  detecting a rotation direction and a rotation position of the hub;
  sending a signal to the reversing valve of the control valve module according to the rotation direction and the rotation position of the each of the hub, to simultaneously convert the flow directions of the hydraulic oil in the oil line for the rod cavity and the oil line for the rodless cavity of at least one of the three or more main drive hydraulic cylinders;
  monitoring a current displacement amount of the piston rod of the main drive hydraulic cylinder;
  comparing the current displacement amount with an displacement amount in an initial state of the main drive hydraulic cylinder to acquire a relative displacement amount of the main drive hydraulic cylinder; and
  controlling the main drive hydraulic cylinder to stop running when the relative displacement amount reaches a predetermined threshold.

13. A driving method for barring, which is used to drive an impeller of a wind generator set to rotate and maintain stationary at a predetermined position by the hydraulic driving system for barring according to claim 1, characterized in that the driving method comprises the steps of:
  initializing alignment;
  determining rotation direction and rotation angle;
  driving main drive hydraulic cylinders to rotate a generator rotor by a small angle;
  maintaining position;
  retracting the main drive hydraulic cylinders and preparing for the next cycle; and
  cyclingly driving the main drive hydraulic cylinders to rotate the generator rotor when the driving does not reach a preset angle, and performing stopping and maintaining the position when the drive reaches the preset angle.

* * * * *